United States Patent
Schmidlin et al.

(10) Patent No.: US 10,419,911 B2
(45) Date of Patent: Sep. 17, 2019

(54) MOBILE COMMUNICATION DEVICE AND METHOD FOR MANAGING OPERATION OF A PLURALITY OF ACTUATORS

(71) Applicant: BELIMO HOLDING AG, Hinwil (CH)

(72) Inventors: Peter Schmidlin, Uster (CH); Marc Thuillard, Uetikon am See (CH); Kurt Meier, Wernetshausen (CH); Daniel Roner, Uerikon (CH)

(73) Assignee: BELIMO HOLDING AG, Hinwil (CH)

( * ) Notice: Subject to any disclaimer, the term of this patent is extended or adjusted under 35 U.S.C. 154(b) by 0 days.

(21) Appl. No.: 15/039,538

(22) PCT Filed: Dec. 3, 2014

(86) PCT No.: PCT/EP2014/003214
§ 371 (c)(1),
(2) Date: May 26, 2016

(87) PCT Pub. No.: WO2015/090517
PCT Pub. Date: Jun. 25, 2015

(65) Prior Publication Data
US 2017/0026779 A1    Jan. 26, 2017

(30) Foreign Application Priority Data
Dec. 17, 2013  (CH) ........................................ 2088/13

(51) Int. Cl.
*H04B 7/00*    (2006.01)
*H04W 4/80*    (2018.01)
(Continued)

(52) U.S. Cl.
CPC ......... *H04W 4/80* (2018.02); *H04M 1/72533* (2013.01); *H04W 4/38* (2018.02); *H04W 4/70* (2018.02)

(58) Field of Classification Search
CPC . H04M 1/72533; H04W 4/005; H04W 4/008; H04W 4/006
See application file for complete search history.

(56) References Cited

U.S. PATENT DOCUMENTS

| 7,753,788 B2 | 7/2010 | Lum et al. |
| 8,727,882 B2 | 5/2014 | Lum et al. |

(Continued)

FOREIGN PATENT DOCUMENTS

| CN | 1654104 A1 | 8/2005 |
| RU | 2487388 C2 | 7/2013 |

(Continued)

OTHER PUBLICATIONS

International Search Report of PCT/EP2014/003214, dated Jun. 9, 2015. [PCT/ISA/210].

(Continued)

*Primary Examiner* — Edward F Urban
*Assistant Examiner* — Max Mathew
(74) *Attorney, Agent, or Firm* — Sughrue Mion, PLLC

(57) ABSTRACT

A mobile communication device (2) comprises a mobile radio communication module, configured for data communication in a mobile radio communication network, and a close range radio communication module, configured to establish a local communication link (43) to an actuator (3) via a close range radio communication interface (33) that is connected to the actuator (3) and located in communication range of the close range radio communication module. The mobile communication device (2) further comprises a processing unit connected to the mobile radio communication (Continued)

module and the close range radio communication module (23), and configured to exchange location-specific data with a remote data server (8) via the mobile radio communication network, the contents of the location-specific data being dependent on identification information associated with the local communication link (43) to the actuator (3).

20 Claims, 5 Drawing Sheets

(51) Int. Cl.
*H04W 4/70* (2018.01)
*H04W 4/38* (2018.01)
*H04M 1/725* (2006.01)

(56) References Cited

U.S. PATENT DOCUMENTS

| | | | |
|---|---|---|---|
| 9,427,660 B2 | 8/2016 | Lum et al. | |
| 9,808,712 B2 | 11/2017 | Lum et al. | |
| 2005/0170889 A1 | 8/2005 | Lum et al. | |
| 2006/0097063 A1* | 5/2006 | Zeevi | F24F 11/30 236/49.3 |
| 2009/0219145 A1* | 9/2009 | Wong | H04W 4/029 340/286.02 |
| 2010/0178984 A1 | 7/2010 | Lum et al. | |
| 2010/0261465 A1* | 10/2010 | Rhoads | G08C 17/00 455/420 |
| 2010/0297942 A1* | 11/2010 | Kaiser | H04W 12/06 455/41.2 |
| 2010/0302009 A1* | 12/2010 | Hoeksel | G01D 21/00 340/10.1 |
| 2011/0298301 A1* | 12/2011 | Wong | H04L 12/2827 307/116 |
| 2012/0064923 A1 | 3/2012 | Imes et al. | |
| 2012/0178431 A1* | 7/2012 | Gold | H04M 1/7253 455/420 |
| 2012/0280783 A1* | 11/2012 | Gerhardt | G07C 9/00309 340/5.6 |
| 2015/0365825 A1* | 12/2015 | De Leon | H04L 63/08 726/19 |
| 2016/0323825 A1* | 11/2016 | Yamaji | H04W 4/80 |
| 2017/0043246 A1 | 2/2017 | Lum et al. | |
| 2018/0292248 A1* | 10/2018 | Heizenroeder | G01F 1/00 |

FOREIGN PATENT DOCUMENTS

WO 2008079856 A2 7/2008
WO 2014/131485 A1 9/2014

OTHER PUBLICATIONS

Written Opinion of PCT/EP2014/003214, dated Jun. 9, 2015. [PCT/ISA/237].
Translation of Communication dated Dec. 27, 2018, by the Intellectual Property Office of the P.R.C. in application No. 201480069253.2.
Communication dated Nov. 2, 2018, from the Russian Federal Service for Intellectual Property in counterpart Application No. 2016127411/08.

* cited by examiner

MOBILE COMMUNICATION DEVICE AND METHOD FOR MANAGING OPERATION OF A PLURALITY OF ACTUATORS

CROSS REFERENCE TO RELATED APPLICATIONS

This application is a National Stage of International Application No. PCT/EP2014/003214 filed Dec. 3, 2014, claiming priority based on Swiss Patent Application No. 02088/13 filed Dec. 17, 2013, the contents of all of which are incorporated herein by reference in their entirety.

FIELD OF THE INVENTION

The present invention relates to a mobile communication device and a method for managing operation of a plurality of actuators. Specifically, the present invention relates to a mobile communication device for data communication in a mobile radio communication network, such as a cellular telephone network or a wireless local area network (WLAN), and a method using the mobile communication device for managing the operation of a plurality of actuators.

BACKGROUND OF THE INVENTION

In addition to an electric motor, actuators are typically provided with a controller having a processing unit and a data store for storing configuration data for operating the actuator and for recording operation-related data by the actuator. In the field of Heating, Ventilation, Air Conditioning, and Cooling (HVAC), the electric motor is coupled to a valve or damper for controlling the flow of a fluid such as water or air. The configuration data includes configuration parameters such as motor speed, closing time, opening time, etc. The operation-related data includes values such as number of cycles, number of movements, maximum travel angle, minimum travel angle, actuator malfunctions and error conditions, etc. In HVAC applications, the controller is connected to sensors such as a flow sensor, a pressure sensor, one or more temperature sensors, a rotation sensor, a position sensor, etc., and the configuration data further includes configuration parameters such as a target value of volume flow, a set value of altitude for adjusting the measurement of a flow sensor, etc. Moreover, a section of the data store further has stored therein program code for controlling the processing unit. In HVAC applications, the program code includes various control algorithms for controlling the motor to open and close an orifice of the valve or damper to regulate the flow of fluid, e.g. with regards to differential pressure, room temperature, flow of energy, etc. Although the storing of configuration data, program code, and/or operation-related data would make possible flexible management and operation of such actuators, the actual management of operation of these actuators is typically not as advanced as it could be, because the actuators are not connected (wired) to a communication network. Thus, it would be desirable to improve the actual management of operation of actuators, whereby the term "management of operation" is not limited to defining the operation of individual actuators but also includes controlling and monitoring operation of a plurality of actuators.

US 2010/0261465 describes methods and systems for enabling interactions between a cell phone and devices, such as a thermostat, a parking meter, or a hotel alarm clock. According to US 2010/0261465 the cell phone determines the identity of the device by using the cell phone's camera to obtain identifier information, such as a digital watermark or a bar code, by employing WiFi (WLAN) emissions from the device, e.g. the device's MAC identifier, by using an RFID chip, or a Bluetooth identifier from a Bluetooth short range wireless broadcast. Based on the identifier information, a server transmits to the cellular phone a graphical user interface that enables the user to control the device from the cellular phone.

US 2009/0219145 describes a device for monitoring electrical devices in a building, such as lights, power outlets, heating apparatus, computers, DVD players, projectors, HVAC devices such as variable air volume devices or fan coil units, thermostats, security system components, or other devices installed in a building. The electrical devices have device information including the physical location of the device with respect to the building. The devices include a communication module for communicating the location and power consumption via a wired or a wireless communication network to a system controller, e.g. implemented on a server. Some electrical devices are connected wirelessly through a gateway node to a wired communication network.

US 2012/0178431 describes a proximity-enabled remote control method. Devices that can be controlled remotely are tagged by placing an NFC element physically near the device or attaching the NFC element to the device. Depending on device identification obtained from the NFC element, a remote control user interface is loaded into a mobile device. Commands to control the respective device are entered by a user through the remote control user interface. The mobile device communicates the user commands wirelessly to a remote computer that is remote and physically separate from the device to be controlled. The remote computer communicates, e.g. via the Internet, information related to the user command to an object controller for the device. The object controller makes the device perform an action in response to the user command.

SUMMARY OF THE INVENTION

It is an object of this invention to provide a mobile communication device and a method for managing operation of a plurality of actuators, which mobile communication device and method do not have at least some of the disadvantages of the prior art. In particular, it is an object of the present invention to provide a mobile communication device and a method for managing, including monitoring, operation of a plurality of actuators which are not necessarily wired to a communication network.

According to the present invention, these objects are achieved through the features of the independent claims. In addition, further advantageous embodiments follow from the dependent claims and the description.

A mobile communication device comprises a mobile radio communication module configured for data communication in a mobile radio communication network, such as a cellular telephone network or a WLAN.

According to the present invention, the above-mentioned objects are particularly achieved in that, in addition to the mobile radio communication module, the mobile communication device further comprises a close range radio communication module, configured to establish a local communication link to an actuator via a close range radio communication interface that is connected to the actuator and located in communication range of the close range radio communication module. The mobile communication device further comprises a processing unit, connected to the mobile radio communication module and the close range radio communication module, and configured to exchange location-specific actuator data between a data store of the actuator and a remote data server via the local communication link and the mobile radio communication network, the contents of the location-specific actuator data being dependent on identification information associated with the local communication link to the actuator. Thus, location-specific actuator data is defined based on a local, on-site connection established by the mobile communication device via a close range radio communication interface to an actuator, making it possible, e.g. in the remote server, to identify information relevant for the particular actuator (and thus its location) or associate actuator information with the particular actuator (and thus its location), respectively.

In an embodiment, the processing unit is further configured to determine interface identification information, which identifies the close range radio communication interface associated with the local communication link, and to exchange the location-specific actuator data defined by the interface identification information. Thus, based on the local, on-site connection, it is possible to determine location-specific actuator data relevant for or assignable to one or more actuators, which are connected to the close range radio communication interface identified by the interface identification information.

In an embodiment, the processing unit is further configured to determine actuator identification information, which identifies the actuator associated with the local communication link, and to exchange location-specific actuator data defined by the actuator identification information. Thus, based on the local, on-site connection, it is possible to determine location-specific actuator data relevant for or assignable to the actuator which is identified by the actuator identification information.

In another embodiment, the close range radio communication module is further configured to establish automatically the local communication link to the close range radio communication interface upon the close range radio communication interface being located in communication range of the close range radio communication module.

In an embodiment, the processing unit is further configured to determine actuator identification information of one or more actuators connected to the close range radio communication interface, to show on a display screen the actuator identification information by displaying identification numbers of the actuators, descriptive names of the actuators, visual representations of the actuators, location indication of the actuators, a building or floor plan including markings of the actuators, and/or a wiring plan including markings of the actuators. Thus, based on the local, on-site connection, it is possible to indicate to a user the actuators located in the vicinity and indicate their location.

In another embodiment, the processing unit is further configured to receive from a user selection instructions for selecting at least one of the actuators connected to the close range radio communication interface, and to establish the local communication link via the close range radio communication interface to the at least one actuator defined by the selection instructions.

In an embodiment, the processing unit is further configured to show a building or floor plan on a display screen, and to indicate on the building or floor plan a particular actuator dependent on the identification information associated with the local communication link to the actuator. Thus, based on the local, on-site connection, it is possible to indicate to a user the location of an actuator in the vicinity.

In another embodiment, the processing unit is further configured to receive from the remote data server location-specific actuator data via the mobile radio communication network, and to transfer the location-specific actuator data via the local communication link to the actuator, the location-specific actuator data including program code for the actuator, configuration parameters for the actuator, and/or a value of altitude, e.g. an altitude value for a flow or pressure sensor connected to the actuator or its controller, respectively. Thus, using the local, on-site connection, it is possible to configure and/or program an actuator and devices connected to the actuator or its controller, respectively.

In an embodiment, the processing unit is further configured to retrieve the location-specific actuator data via the local communication link from the actuator, and to transfer the location-specific actuator data via the mobile radio communication network to the remote data server. The location-specific actuator data includes operation-related data recorded by the actuator and/or configuration data stored in the actuator. The operation-related actuator data indicates for the actuator the number of cycles, the number of movements, the maximum travel angle, the minimum travel angle, the current position, the maximum position, the minimum position, current sensor values, a combination of sensor values, the state of an energy storage element of the actuator, the type of valve connected to the actuator, the Kvs value of the valve, malfunction information of the actuator and/or an altitude value stored for a flow or pressure sensor connected to the actuator or its controller, respectively. Thus, using the local, on-site connection, it is possible to collect operation-related data and/or configuration data from an actuator and devices connected to the actuator or its controller, respectively.

In addition to the mobile communication device outlined above, the present invention also relates to a method of managing operation of a plurality of actuators, whereby the method comprises: establishing a local communication link from a mobile communication device to one of the actuators via a close range radio communication interface that is connected to the actuator and located in communication range of a close range radio communication module of the mobile communication device; determining by a processing unit of the mobile communication device identification information associated with the local communication link; and exchanging location-specific actuator data by the mobile communication device between a data store of the actuator and a remote data server via the local communication link and a mobile radio communication network, the contents of the location-specific actuator data being dependent on the identification information associated with the local communication link to the actuator.

In addition to the mobile the communication device and the method of managing operation of a plurality of actuators, the present invention also relates to a computer program product comprising a non-transient computer readable medium having stored thereon computer program code. The computer program code is configured to direct a processor of a mobile communication device, which comprises a mobile radio communication module, connected to the processor and configured for data communication in a mobile radio communication network, and, in addition to the mobile radio communication module, a close range radio communication module, connected to the processor and configured to establish a local communication link to an actuator via a close range radio communication interface that is connected to the actuator and located in communication range of the close range radio communication module. The computer program code is configured to direct the processor of the mobile communication device such that the processor exchanges location-specific actuator data between a data store of the actuator and a remote data server via the local communication link and the mobile radio communication network, the contents of the location-specific actuator data being dependent on identification information associated with the local communication link to the actuator.

In a further aspect, the invention relates to a display terminal comprising a display screen, a communication bus interface configured to connect the display terminal to one or more actuators via a communication bus, a wireless communication interface configured to exchange data with a mobile communication device, and a processing unit connected to the communication bus interface and the wireless communication interface, whereby the processing unit is configured to show on the display screen identification information, which identifies a particular actuator that is connected to the communication bus, and to perform at least one of:

transferring via the wireless communication interface to the mobile communication device, while the identification information of the particular actuator is shown on the display screen, actuator data received from the particular actuator, and transferring configuration data, received from the mobile communication device while the identification information of the particular actuator is shown on the display screen, via the communication bus to the particular actuator.

In a variant of the further aspect, the processing unit is further configured to show on the display screen the identification information of a particular actuator together with an error indication, upon receiving an error message from the particular actuator, to extract detailed error information from the error message, and to transfer the detailed error information to the mobile communication device, upon detection of the mobile communication device by the wireless communication interface while the identification information of the particular actuator is shown on the display screen.

In another variant of the further aspect, the processing unit is further configured to show on the display screen the identification information of a particular actuator, upon receiving a selection instruction for the particular actuator, and to transfer to the particular actuator the configuration data received from the mobile communication device while the identification information of the particular actuator is shown on the display screen.

In a variant of the further aspect, the processing unit is further configured to show on the display screen a building or floor plan which illustrates the location of one or more actuators that are connected to the communication bus, to receive from a user a selection instruction for one of the locations via the wireless communication interface or data entry elements of the display terminal, and to show on the display screen the identification information of the particular actuator that is located at the selected location.

In another variant of the further aspect, the processing unit is further configured to receive from actuators connected to the communication bus operation-related actuator data, the operation-related actuator data indicating for a particular actuator the number of cycles, the number of movements, maximum travel angle, minimum travel angle, the current position, the maximum position, the minimum position, current sensor values, a combination of sensor values, the state of an energy storage element of the actuator, the type of valve connected to the actuator, the Kvs value of the valve, and/or an altitude value stored for a flow or pressure sensor connected to the actuator or its controller, respectively, and to transfer the operation-related actuator data via the wireless communication interface to the mobile communication device.

In a variant of the further aspect, the processing unit is further configured to receive from the mobile communication device configuration data for the particular actuator via the wireless communication interface, while the identification information of the particular actuator is shown on the display screen, and to transfer the configuration data via the communication bus to the particular actuator, the configuration data including program code for the actuator, configuration parameters for the actuator, and/or a value of altitude, e.g. an altitude value for a flow or pressure sensor connected to the actuator or its controller, respectively.

In yet a further aspect, the invention relates to an HVAC system that comprises an actuator and a sensor system. The actuator comprises an electric motor and a controller connected to the electric motor. The sensor system comprises at least one sensor configured to measure an operational value of the HVAC system. The sensor system further comprises a close range radio communication interface that is connected to the sensor and configured to establish a local communication link to the actuator via a close range radio communication interface of the actuator. The close range radio communication interface is further configured to transmit operational values measured by the sensor via the local communication link to the actuator. The controller of the actuator is connected to the actuator's close range radio communication interface and configured to receive the operational values from the sensor via the local communication link and to control operation of the actuator's electric motor in accordance with the operational values received from the sensor.

In another variant of the yet further aspect, the sensor system comprises a controller connected to the sensor and configured to generate actuator control signals in accordance with the operational values measured by the sensor. The controller is further configured to transmit the control signals via the local communication link to the actuator. The actuator is configured to receive the actuator control signals via the local communication link and to control operation of the actuator's electric motor in accordance with the received actuator control signals.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
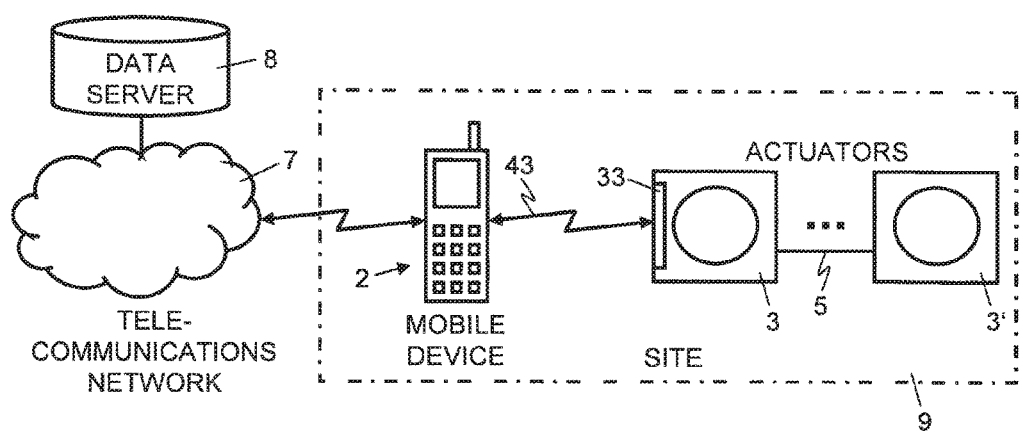
FIG. 1: shows a block diagram illustrating schematically a mobile communication device that is arranged on-site with one or more actuators and configured for close range radio communication with one of these actuators.

In FIGS. 1, 2, 3, 4, 8, and 10, reference numeral 2 refers to an operable mobile communication device. The mobile communication device 2 is implemented as a mobile phone, a tablet computer, a PDA computer (personal data organizer), a notebook computer, or another computerized electronic, portable, mobile communication device.

Figure 4:
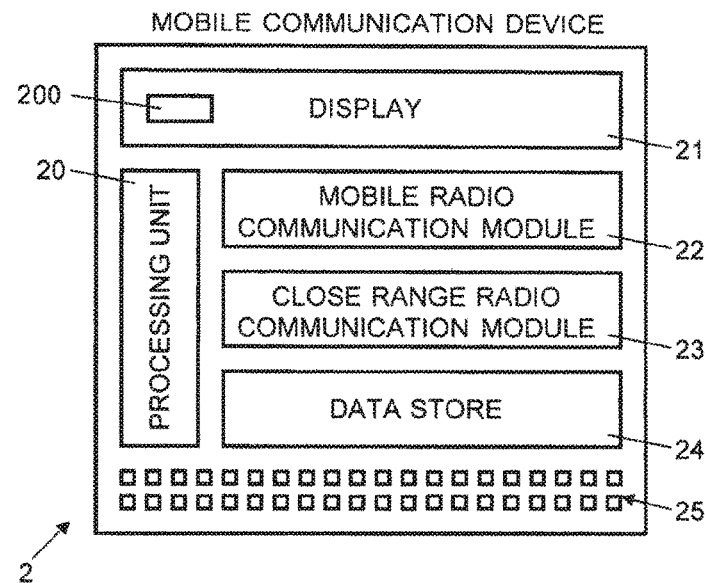
FIG. 4: shows a block diagram illustrating schematically a mobile communication device that is provided with a mobile radio communication module, for data communication in a mobile radio communication network, and a close range radio communication module, for establishing a local communication link to an on-site actuator.

As illustrated in FIG. 4, the mobile communication device 2 comprises a processing unit 20, a display 21, a mobile radio communication module 22, a close range radio communication module 23, a data store 24, e.g. data memory such as RAM (Random Access Memory), flash memory, SSD (Solid State Drive), or other data storage units, and operating elements 25. Depending on the embodiment of the mobile communication device 2, the operating elements 25 include one or more keys, a keyboard, a touchpad, and/or a touch sensitive screen, which may be implemented as part of the display 21.

In FIGS. 2, 3, 5, and 9, reference numeral 1 refers to a display terminal. For example, the display terminal 1 is implemented as a wall mountable display unit or designed as a desktop unit.

Figure 5:
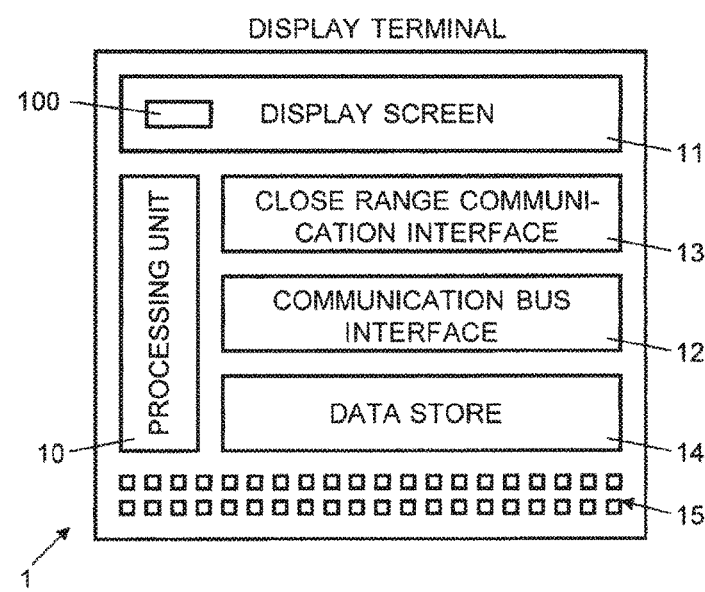
FIG. 5: shows a block diagram illustrating schematically a display terminal that is provided with a close range radio communication interface, for data communication with a mobile communication device, and a communication bus interface for data communication with one or more actuators via a communication bus.

As illustrated in FIG. 5, the display terminal 1 comprises a processing unit 10, a display screen 11, a communication bus interface 12, a close range radio communication interface 13, a data store 14, e.g. data memory such as RAM (Random Access Memory), flash memory, SSD (Solid State Drive), or other data storage units, and operating elements 15. Depending on the embodiment of the display terminal 1, the operating elements 15 include one or more keys, a keyboard, a touchpad, and/or a touch sensitive screen, which may be implemented as part of the display screen 11. In an embodiment, the display terminal 1 is implemented as a thermostat and includes a temperature sensor connected to the processing unit 10.

The processing units 10, 20 comprise each one or more operable processors and a computer readable medium having stored thereon computer program code for controlling the processor(s). For example, the computer program code for controlling the processing unit 20 is arranged in an applet that can be loaded and stored in data store 24 of the mobile communication device 2.

The mobile radio communication module 22 is configured for data communication via a mobile radio communication network such as a WLAN and/or a cellular telephone network, e.g. a GSM network (Global System for Mobile Communication), a UMTS network (Universal Mobile Telephone System), or another mobile radio telephone network. The mobile radio communication module 22 is further configured to exchange data with a remote data server 8 via telecommunications network 7 including the mobile radio communication network and the Internet.

The data server 8 comprises one or more operable computers with one or more processors, data and program storage, and databases. The data server 8 is configured to receive from the mobile communication device 2 via the telecommunications network 7 data requests and data submissions. Specifically, the data server 8 is configured to retrieve from its databases and transmit to the mobile communication device 2 data, in response to data requests from the mobile communication device 2, to extract from data submissions received from the mobile communication device 2 data and store the extracted data in its databases, and to process the data received from one or more mobile communication devices 2 for one or more actuators or locations, respectively, as will be explained below in more detail.

The close range radio communication module 23 and the close range radio communication interface 13, 33 are each configured for wireless radio-based data communication within a defined close distance range, starting from near field communication, where the communication devices are brought together so that they touch each other or are in close proximity to each other, e.g. within a few centimeters or inches, up to short distance communication, where the communication devices are located within a few meters from each other. Specifically, the close range radio communication module 23 and the close range radio communication interface 13, 33 comprise each an NFC (Near Field Communication) module, e.g. based on existing RFID standards such as ISO/IEC 14443 and ISO/IEC 18092, and/or a Bluetooth communication module (originally defined in IEEE 802.15.1).

The communication bus interface 12 is configured to connect the display terminal 1 to a communication bus 5 for data communication via the communication bus 5. The communication bus 5 is implemented as a parallel or serial electrical or optical wire-based data communication bus, e.g. an MP-Bus as developed and provided by the applicant.

Figure 8:
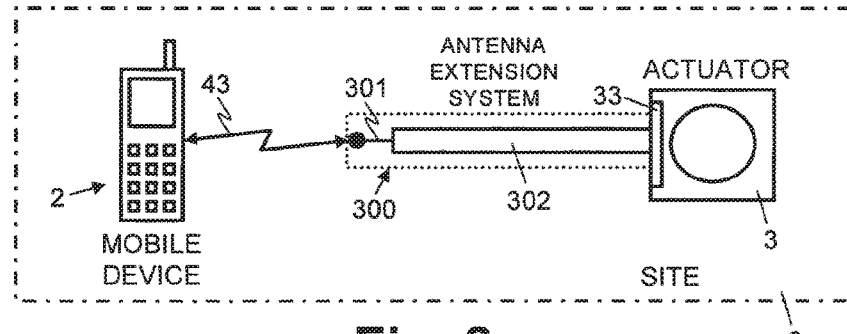
FIG. 8: shows a block diagram illustrating schematically a mobile communication device that is arranged on-site with an actuator that is provided with an antenna extension for close range radio communication with the mobile communication device.
Figure 9:
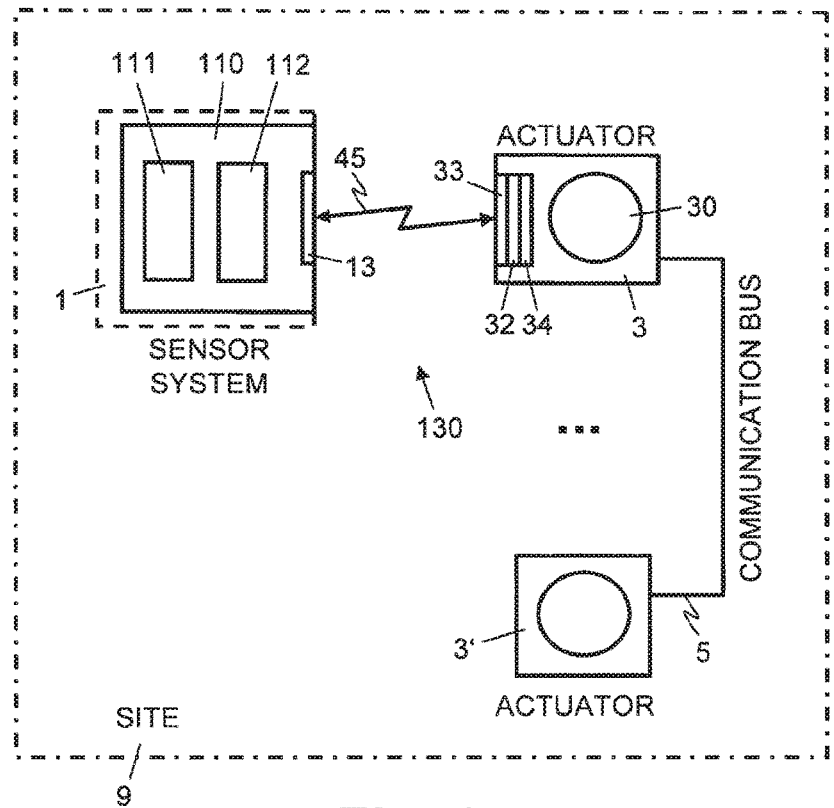
FIG. 9: shows a block diagram illustrating schematically a sensor system and an actuator that are arranged on-site and in close range radio communication.
Figure 10:
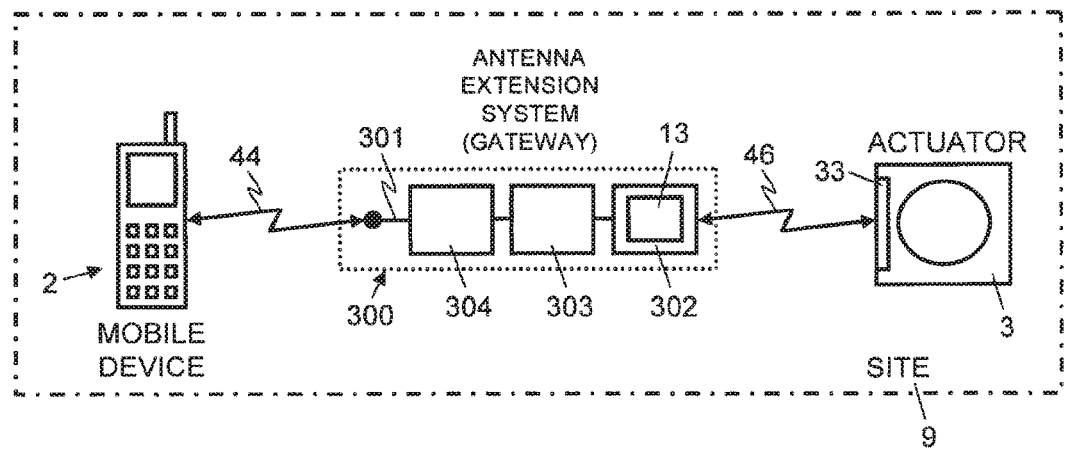
FIG. 10: shows a block diagram illustrating schematically a gateway system with a close range radio communication module connected to a further radio communication module.

In FIGS. 1, 2, 3, 8, 9, and 10, reference numeral 9 refers to a particular site, e.g. a building, a floor or story in a building, or one or more rooms in a building. As illustrated in FIGS. 1, 2, 3, 8, 9, and 10, one or more operable actuators 3, 3' are arranged on the site 9. The actuators 3, 3' include an electric motor and are connected to an electrical power source. The actuators 3, 3' are configured to drive valves and/or dampers for controlling the flow of fluids, e.g. in an HVAC system. As illustrated in FIGS. 1, 2, 3, and 9, at least some actuators 3, 3' are connected to the communication bus 5 and/or interconnected by the communication bus 5. As shown in FIG. 9 (but also applicable to actuators 3, 3' shown or indicated in FIGS. 1, 2, 3, 6, 7, 8, 9, and 10), the actuators 3, 3' comprise a data store 32 accessible to a controller 34 of the actuator 3 and to the actuator's close range radio communication interface 33 or the actuator's communication bus interface, respectively. The data store 32 includes data memory such as RAM (Random Access Memory), flash memory, SSD (Solid State Drive), and/or other data storage units. Depending on the embodiment and/or application, read and/or write access to the data store 32 and data stored therein is controlled, e.g. based on a cryptographic access key and/or a password. One skilled in the art will understand that access control may be executed by a processor of the actuator's controller 34, the actuator's close range radio communication interface 33, and/or the actuator's communication bus interface. In a scenario where multiple actuators' 3, 3' are interconnected by way of a communication bus 5, the access controlling processors are configured to reuse/accept the password and/or cryptographic access key for accessing any other actuator 3, 3' on the communication bus 5, so that the user is required to enter a password just once to access more than one actuators 3, 3' on the communication bus 5. In other words, multiple actuators 3, 3' interconnected on communication bus 5, or their controllers or processors, respectively, are configured to pass on a user's access credentials from one actuator 3, 3' to another, or inherit access rights, respectively, from another actuator 3, 3' (or its controller or processor) that checked and verified the user's access credentials.

As illustrated in FIGS. 1, 3, 8, 9, and 10, at least some actuators 3 include a close range radio communication interface 33 for close range wireless data communication, as described above in the context of the mobile communication device 2 and the display terminal 1.

As illustrated schematically in FIGS. 1, 2, 3, and 8, the close range radio communication module 23 is configured to establish a local communication link 41, 43 to an actuator 3, 3' via a close range radio communication interface 13, 33 that is connected to the actuator 3, 3' and located in communication range of the close range radio communication module 23. A local communication link 41, 43 is established by:

(1) both communication entities, i.e. the mobile communication device 2 and the actuators 3, 3', being on-site, i.e. on the site 9; and (2) the close range radio communication module 23 of the mobile communication device 2 and the close range radio communication interface 13, 33 that is connected to the actuator 3, 3' being located within communication range of each other.

Figure 3:
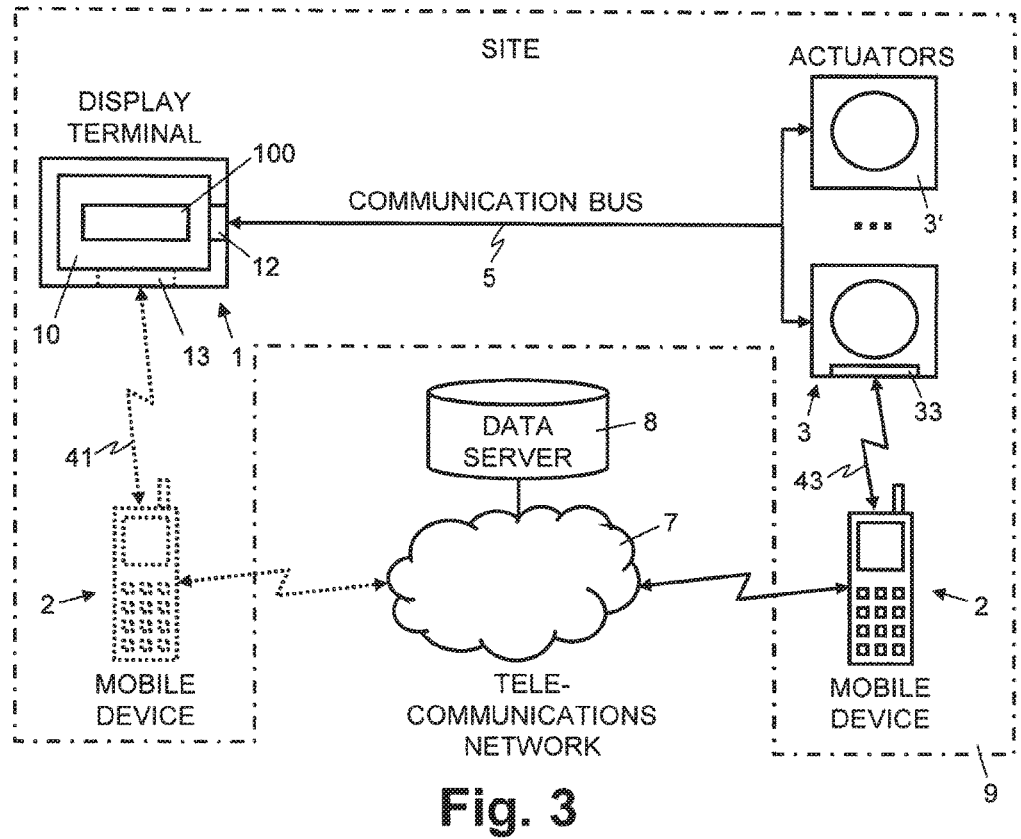
FIG. 3: shows a block diagram illustrating schematically mobile communication devices that are arranged on-site with one or more actuators and configured for close range radio communication with one of these actuators and/or with a display terminal connected to the actuators.

In FIGS. 1, 3, and 8, reference numeral 43 refers to a local communication link established directly between the close range radio communication module 23 of the mobile communication device 2 and the close range radio communication interface 33 of the actuator 3 (direct local communication link 43). The direct local communication link 43 is established as a one-to-one wireless communication link between the mobile communication device 2 and the actuator 3, without any intermittent communication bus 5.

Figure 2:
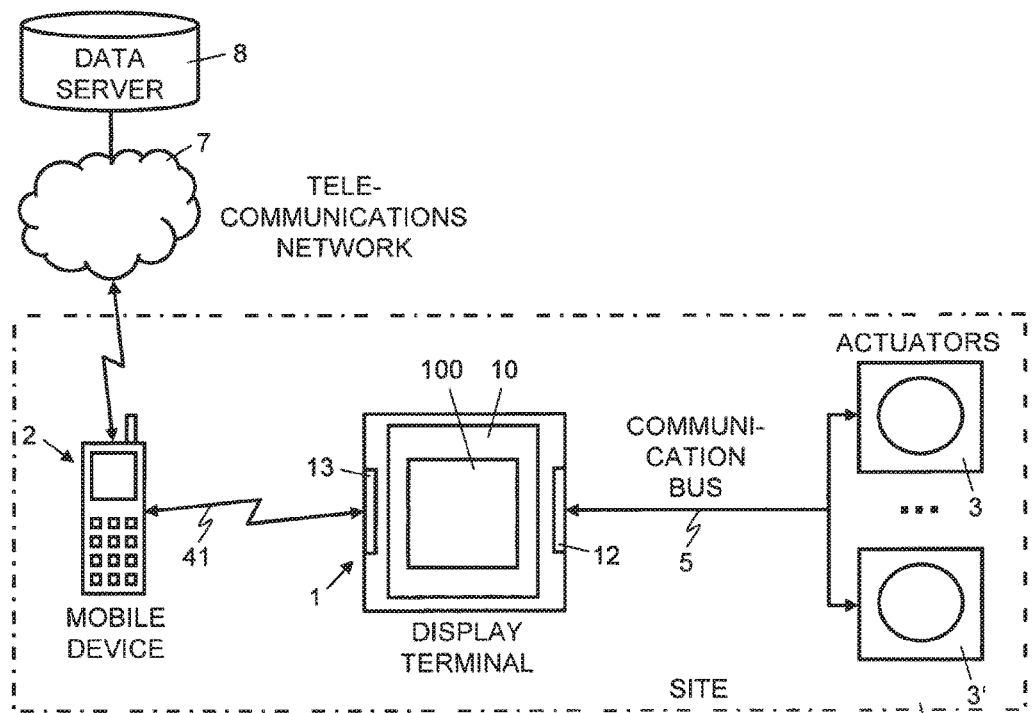
FIG. 2: shows a block diagram illustrating schematically a mobile communication device that is arranged on-site with one or more actuators and configured for close range radio communication with a display terminal connected to the actuators.

In FIGS. 2 and 3, reference numeral 41 refers to a local communication link established between the close range radio communication module 23 of the mobile communication device 2 and the close range radio communication interface 13 of the display terminal 1. The local communication link 41 enables an indirect local communication link between the mobile communication device 2 and the actuator 3, 3' via the display terminal 1 and the communication bus 5. Specifically, the local communication link 41 enables a one-to-one indirect local communication link between the mobile communication device 2 and a selected one of the actuators 3, 3' connected to the communication bus 5, or a one-to-many indirect local communication link between the mobile communication device 2 and a plurality of actuators 3, 3' connected to the communication bus 5.

Figure 8A:
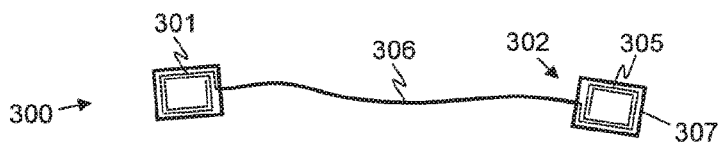
FIG. 8a: shows a block diagram illustrating schematically an antenna extension system that comprises two antenna coils interconnected by an antenna cable.

As illustrated schematically in FIG. 8, in an embodiment the actuator 3 is provided with an antenna extension system 300 configured to extend and/or displace the communication range of the actuator's close range radio communication interface 33. In the embodiment illustrated in FIG. 8, the local communication link 43 between the mobile communication device 2 and the actuator 3, described above in the context of FIGS. 1 and 3, is established via the antenna extension system 300. The antenna extension system 300 comprises an antenna 301 and an antenna coupling system 302. In a wire based embodiment, the antenna coupling system 302 comprises an antenna cable and antenna connectors for coupling electrically the antenna 301 to the actuator's close range radio communication interface 33. Typically, the wire based embodiment is used to extend or displace the actuator's communication range by several meters, e.g. 1-20 meters. In a further embodiment, illustrated in FIG. 8a, the antenna coupling system 302 comprises a coupling antenna 305, e.g. an antenna coil, for coupling electromagnetically (passively) the antenna extension system 300 to the actuator's close range radio communication interface 33. Thus, in this further embodiment, the antenna extension system 300 comprises an antenna cable 306, a first antenna 301 (e.g. a first antenna coil) connected electrically to one end of the antenna cable 306, and a second antenna 305 (e.g. a second antenna coil) connected electrically to the other end of the antenna cable 306 and used for electromagnetically coupling the antenna extension system 300 to the actuator's close range radio communication interface 33. For example, the coupling antenna 305 is adhered to the actuator 3, on the exterior of its housing in the location of the antenna of the actuator's close range radio communication interface 33. For attaching the coupling antenna 305 to the actuator 3, or to any other device with a close range radio communication interface 33, the coupling antenna 305 is fixed to a carrier plate 307, which is provided, for example, with an adhesive under a peel-off foil, and the actuator 3 has marking(s) indicating the location(s) of its antenna(s). Alternatively, the antenna coupling system 302 comprises a radio transceiver system, e.g. based on Bluetooth, configured to establish a wireless communication link between the antenna 301 and the actuator's close range radio communication interface 33. Typically, the wireless embodiment is used to extend or displace the actuator's communication range by a few meters, e.g. 1-5 meters. In another embodiment illustrated in FIG. 10, the antenna extension system 300 is implemented as a gateway that comprises a close range radio communication module 13, a further second radio communication module 304, and a gateway module 303 interconnecting the close range radio communication module 13 and the radio communication module 304. The close range radio communication module 13 is implemented as the antenna coupling system 302 and configured for near field communication (NFC) with the actuator's close range radio communication interface 33 over a direct wireless local communication link 46. The further second radio communication module 304, e.g. a WLAN and/or Bluetooth radio communication module, is connected to the close range radio communication module 13 through the gateway module 303 and has a greater communication range than the close range radio communication module 13. The gateway module 303 is configured to receive data from the actuator's close range radio communication interface 33 via the close range radio communication module 13 and to transmit the received data by way of the further second radio communication module 304 over an extended wireless communication link 44 to a mobile or fixed communication device 2, thereby extending the communication range of the actuator 3, 3' beyond the communication range of its close range radio communication interface 33. Likewise, in opposite communication direction, the gateway module 303 is configured to receive data from a mobile or fixed communication device 2, through the further second radio communication module 304, and to transmit the received data by way of its close range radio communication module 13 to the actuator's close range radio communication interface 33. The gateway module 303 is implemented as an electronic circuit, e.g. an ASIC (application specific integrated circuit).

Figure 7:
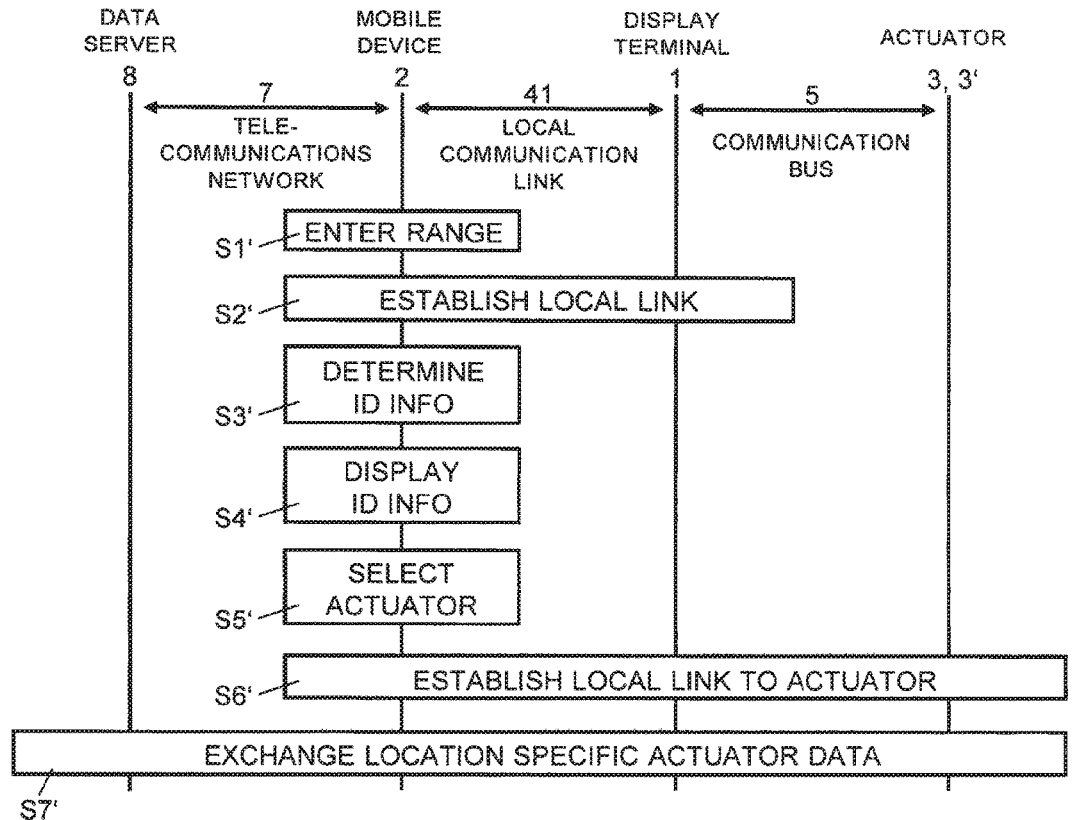
FIG. 7: shows a data flow diagram illustrating schematically the data flow between a data server, a mobile device, and an actuator via an indirect local communication link through a display terminal.
Figure 6:
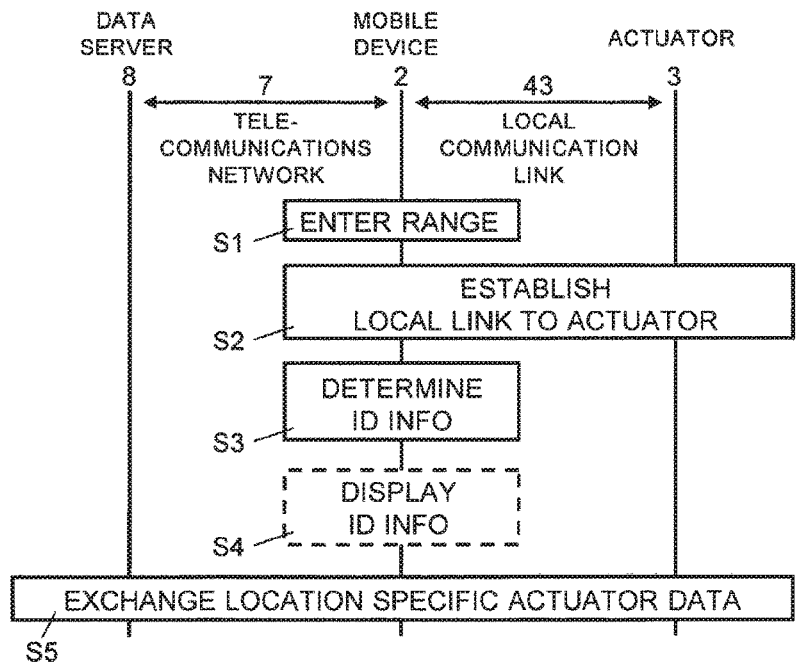
FIG. 6: shows a data flow diagram illustrating schematically the data flow between a data server, a mobile device, and an actuator via a direct local communication link.

In the following paragraphs, described with reference to FIGS. 6 and 7 are possible sequences of steps performed by the mobile communication device 2 or its processing unit 20, mobile radio communication module 22, and close range radio communication module 23, respectively, for monitoring and managing operation of a plurality of actuators 3, 3'.

As illustrated in FIG. 6, in step S1, the mobile communication device 2 enters the communication range of actuator 3 or its close range radio communication interface 33, respectively. The actuator 3 is stationary and the mobile communication device 2 is moved into the communication range by its user. In a static scenario, e.g. in locations that are not visited frequently or regularly by users with mobile communication devices 2, a "mobile" communication device 2 is actually installed in a fixed or stationary fashion within the communication range of one or more actuator 3 or its close range radio communication interface 33, in order to include actuators 3 in such locations in data mining and device update applications, described below in more detail, without having to connect these actuators 3 to a wired communication network or to implement in these actuators a mobile radio communication module for data communication via a mobile radio communication network such as a WLAN and/or a cellular telephone network. In the static scenario, the "mobile" communication device 2 is connected through a wired or inductive adapter to a power supply. In suitable locations with exposure to daylight, photovoltaic solar cells are connected as a power source.

In step S2, a direct local communication link 43 is established between the mobile communication device 2 and the actuator 3. Specifically, a wireless local communication link 43 is established between the close range communication module 23 of the mobile communication device 2 and the close range radio communication interface 33 of the actuator 3. The wireless local communication link 43 is established automatically by the close range radio communication module 23 when the close range radio communication interface 33 of the actuator 3 is located within the communication range of the close range radio communication module 23.

In step S3, the processing unit 20 of the mobile communication device 2 determines identification information associated with the local communication link 43 to the actuator 3. Specifically, the processing unit 20 determines actuator identification information, which identifies the actuator 3 associated with the local communication link 43. In an embodiment, the actuator identification information corresponds to interface identification information which identifies and is stored in the close range radio communication interface 33 of the actuator 3 or in data store 32, respectively.

In optional step S4, the processing unit 20 shows the identification information 200 associated with the local communication link 43 on the display screen 21 of the mobile communication device 2. Depending on the embodiment, the processing unit 20 shows on the display screen 21 the actuator identification information by displaying the identification number of the actuator 3, a descriptive name of the actuator 3, a visual representation of the actuator 3, a location indication of the actuator 3, a building or floor plan including a marking of the actuator 3, and/or a wiring plan including a marking of the actuator 3. Markings of items in a building or floor or wiring plan, e.g. an actuator 3, are provided as highlighted, emphasized, and/or enlarged text, numbers, graphs, and/or areas, for example. The building or floor plan and/or a wiring plan is/are stored in the data store 24 of the mobile communication device 2, or retrieved from the remote data server 8, e.g. as location-specific data, as will be described below in the context of step S5 or S5', respectively.

In step S5, location-specific data is exchanged between the mobile communication device 2 and the remote data server 8. Specifically, the processing unit 20 uses the mobile radio communication module 22 of the mobile communication device 2 to exchange location-specific data with the remote data server 8 via the telecommunications network 7, particularly, via the mobile radio communication network and the Internet. The content of the location-specific data depends on the identification information associated with the local communication link 43 to the actuator 3. Specifically, the mobile communication device 2 and the remote data server 8 exchange location-specific actuator data which is defined by the actuator identification information. In a further embodiment, the data server 8 identifies the need for a software update for the actuator 3 based on software release and/or error information retrieved from the actuator 3 or based on a list of actuators and/or actuator types that need to be updated; subsequently, a new release or update (patch) of program code is transferred from the remote server 8 via the mobile communication device 2 to the actuator 3 where it is stored in data store 32 or another data store of the actuator controller 34 or its processor.

The exchange of location-specific data between the mobile communication device 2 and the remote data server 8 includes transferring location-specific actuator data form the remote data server 8 via the mobile radio communication network 7 to the mobile communication device 2, and/or transferring location-specific actuator data from the mobile communication device 2 via the mobile radio communication network 7 to the remote data server 8. As illustrated schematically in FIG. 6, the location-specific actuator data is actually exchanged between the actuator 3 and the remote server 8 via the mobile communication device 2.

Specifically, the processing unit 20 uses the mobile radio communication module 22 to receive from the remote data server 8 location-specific actuator data via the mobile radio communication network. Subsequently, the processing unit 20 uses the close range communication module 23 to transfer the received location-specific actuator data via the wireless local communication link 43 to the actuator 3 or its close range communication interface 33, respectively. The location-specific actuator data, transferred from the remote server 8 to the actuator 3, includes program code for the actuator 3, a value of altitude, other configuration parameters for the actuator 3, climate data and/or weather data. At the actuator 3 or a controller 34 of the actuator 3, respectively, the location-specific actuator data is stored in a data store for defining further operation of the actuator 3 and/or its controller 34. Specifically, the program code controls a processor of the actuator 3 or its controller 34, the value of altitude is used to adjust the measurement of an air flow sensor, and further configuration parameters determine the motor speed, a valve or damper closing and/or opening time, a target value of flow, maximum and/or minimum position of the actuator or its motor, respectively, etc. The location-specific climate data and/or weather data is used by the controller 34 of the actuator 3 to control operation of the actuator 3 depending on the local climate and/or the current local weather in the geographical area where the actuator 3 is installed. In an embodiment, the location-specific data further includes a building or floor plan and/or a wiring plan for the site 9 and the location of the respective actuator 3. To control access to the actuator 3, the processing unit 20 requests the user to enter a password, particularly, for writing data into the data store 32 of the actuator 3. At the actuator 3, access authorization is checked based on the password or a cryptographic access key generated by the processing unit 20 from the password, as described above.

With regards to using the value of altitude for adjusting the measurement of an air flow sensor, it shall be explained here that flow sensors that rely on measuring a differential pressure $\Delta p$ for determining the flow $\dot{V} = c \cdot \sqrt{\Delta p}$, where c is a constant value, e.g. c=10, are dependent on air density and, thus, altitude. The air density $p_h [kg/m^3]$ or air pressure $p_h [hPa]$, respectively, at a particular altitude h is defined by the international barometric formula $$p_h = 1.2255 \text{ kg/m}^3 \cdot \left(1 - \frac{6.5 \cdot h}{288 \text{ km}}\right)^{4.255} \text{ or } p_h = 1013 \text{ hPa} \cdot \left(1 - \frac{6.5 \cdot h}{288 \text{ km}}\right)^{5.255},$$

respectively. The measurement error for the differential pressure $\Delta p$ from a sensor calibrated for sea level (h=0 m) is approximately 1% for every 100 m altitude. For example, at 500 m above sea level, the measured differential pressure $\Delta p_{measured}$ has an error of approximately 5%, i.e. $\Delta p_{measured} = 0.95 \cdot \Delta p_{real}$. Consequently, the error for the flow $\dot{V} = c \cdot \sqrt{0.95 \cdot \Delta p} = c \cdot 0.975 \cdot \sqrt{\Delta p}$ is approximately 2.5%. The altitude value h, received at the actuator 3, 3' from the remote server 8, is used to adjust/correct the measurement of the differential pressure $\Delta p_{adjusted} = \Delta p_{measured} \cdot 8809/(8809-h)$ and, thus, the flow $\dot{V}_{adjusted} = c \cdot \sqrt{\Delta p_{measured} \cdot 8809/(8809-h)}$ measured by the flow sensor. Adjusting the differential pressure $\Delta p$ and/or the flow measurement $\dot{V}$ is particularly useful in configurations where the actuator 3, 3' actuates a valve for controlling the size of an orifice and, thus, flow of a fluid, depending on an actual flow measurement measured by a flow sensor.

Moreover, the processing unit 20 uses the close range radio communication module 23 to receive (push mode) or retrieve (pull mode) the location-specific actuator data via the wireless local communication link 43 from the actuator 3, 3' or its close range communication interface 33, respectively. The processing unit 20 links the location-specific actuator data obtained from the actuator with a time stamp that indicates the current time and date. The current time and date is generated by the mobile communication device 2. In a variant, the current time and date is synchronized by mobile communication device 2 or its processing unit 20, respectively, with an external time reference source via the mobile radio communication network 7. Subsequently, the processing unit 20 uses the mobile radio communication module 22 to transfer the received/retrieved and time stamped location-specific actuator data via the mobile radio communication network 7 to the remote server 8. The location-specific actuator data transferred from the actuator 3 to the remote server 8 includes operation-related data recorded by the actuator 3 and/or configuration data stored in the actuator 3. The operation-related actuator data indicates for the actuator 3 the number of cycles, the number of movements, the maximum travel angle, the minimum travel angle, the current position, the maximum position, the minimum position, current sensor values, a combination of sensor values, the state of an energy storage element of the actuator 3 (e.g. battery charge), a type of valve connected to the actuator 3, 3', a Kvs value of the valve, malfunction or error information of the actuator 3, and/or an altitude value stored for a flow or pressure sensor connected to the actuator 3, 3' or its controller 34, respectively. The Kvs value expresses in [m³/h] the amount of flow in a regulating valve at a fully-open valve position and a pressure differential of 1 bar. It should be pointed out, that in an embodiment the operation-related actuator data further includes operation-related actuator data related to another (second) actuator 3' which is transferred to the (first) actuator 3 via a wired or wireless communication link. At the remote server 8, the location-specific actuator data is stored in a database, e.g. assigned to identification and location information associated with the actuator 3, 3' and/or the site 9, as well as a time stamp, for subsequent statistical analysis, correlation analysis, reporting, detection of malfunctioning, etc. For example, the location-specific actuator data is analyzed with regards to correlation with actuator production information and further location specific data, such as climate, weather, humidity, and/or other regional and/or geographical information. Specifically, based on the time stamp linked to the location-specific actuator data, the remote server 8 determines the location-specific actuator data that was received within the same time window from a plurality of mobile communication devices 2 and/or for different locations. The duration of the time window is defined depending on the application and data analysis scenario, for example, the time duration may be 1-5 seconds, 5-60 seconds, 1-5 minutes, 5-60 minutes, 1-5 hours, 1-7 days, or 1-6 months. Storing the location-specific actuator data linked to respective time stamps makes it possible to analyze the collected actuator data for selected locations and time windows. Depending on the application, the location and time specific analysis may be executed through automated statistical analysis or performed by a user "manually", e.g. by reviewing on a display screen actuator data selected and retrieved from the server 8 for specific locations and time windows. For example, the user may compare on the display screen a listing of operation-related actuator data for actuators 3, 3' at a specific location, e.g. a room, a floor, a building, or several buildings at specific coordinates or an address, for a specific time window, possibly including multiple values for each of the actuators 3, 3' along a time line in the time window.

As illustrated in FIG. 7, in step S1', the mobile communication device 2 enters the communication range of display terminal 1 or its close range radio communication interface 13, respectively. Typically, the display terminal 1 is stationary, e.g. mounted fixed on a wall, and the mobile communication device 2 is moved into the communication range by its user.

In step S2', a local communication link 41 is established between the mobile communication device 2 and the display terminal 1. Specifically, a wireless local communication link 41 is established between the close range communication module 23 of the mobile communication device 2 and the close range radio communication interface 33 of the display terminal 1. The wireless local communication link 41 is established automatically by the close range radio communication module 23 when the close range radio communication interface 13 of the display terminal 1 is located within the communication range of the close range radio communication module 23.

In step S3', the processing unit 20 of the mobile communication device 2 determines identification information associated with the local communication link 41 to the display terminal 1. Specifically, the processing unit 20 determines interface identification information which identifies and is stored in the close range radio communication interface 13 of the display terminal 1. In an embodiment, the interface identification information corresponds to terminal identification information which identifies the display terminal 1. In an embodiment, the processing unit 20 further retrieves via the local communication link 41 actuator identification information which is stored in the data store 14 of the display terminal 1 and identifies the actuator(s) 3, 3' that are connected to the display terminal 1 via the communication bus 5. In an alternative embodiment, the processing unit 20 retrieves the actuator identification information from remote server 8 as location specific actuator data, as was described above in the context of step S5.

In step S4', the processing unit 20 shows the identification information 100 associated with the local communication link 41 on the display screen 21 of the mobile communication device 2. Depending on the embodiment, the processing unit 20 shows on the display screen 21 the identification information 100 by displaying an identification number of the display terminal 1, a descriptive name of the display terminal 1, a visual representation of the display terminal 1 (e.g. a photograph, drawing or diagram), a location indication of the display terminal 1, an identification number of the actuator(s) 3, 3', a descriptive name of the actuator(s) 3, 3', a visual representation of the actuator(s) 3, 3', a location indication of the actuator(s) 3, 3', a building or floor plan including a marking of the display terminal 1 and the actuator(s) 3, 3', and/or a wiring plan including a marking of the display terminal 1 and the actuator(s) 3, 3'. In a further embodiment, this information is further displayed on the display screen 11 of the display terminal 1.

In step S5', the processing unit 20 receives from the user of the mobile communication device 2 selection instructions for selecting one of the actuators 3, 3' connected via the communication bus 5 to the display terminal 1 and, thus, to the close range radio communication interface 13. For example, an actuator 3, 3' is selected via the building or floor and/or wiring plan displayed on the display 21 and/or display screen 11, e.g. by clicking or double clicking a respective graphical representation by means of operating elements 25 or a touch screen, etc. Accordingly, the selected actuator 3, 3' is marked on the building or floor and/or wiring plan.

In step S6', an indirect local communication link 41 is established between the mobile communication device 2 and the selected actuator 3, 3' via the display terminal 1 and the communication bus 5. Specifically, the local communication link 41 is established via the wireless local communication link, between the close range communication module 23 of the mobile communication device 2 and the close range radio communication interface 13 of the display terminal 1, via the display terminal 1, and via the communication bus 5 to the selected actuator 3, 3'.

In step S7', location-specific data is exchanged between the mobile communication device 2 and the remote data server 8, as was described above in the context of step S5. In this present case, however, the content of the location-specific data depends on the identification information associated with the local communication link 41 to the selected actuator 3, 3'. Specifically, the mobile communication device 2 and the remote data server 8 exchange location-specific actuator data which is defined by the actuator identification information that identifies the selected actuator 3, 3'. As illustrated schematically in FIG. 7, the location-specific actuator data is actually exchanged between the selected actuator 3, 3' and the remote server 8 via the communication bus 5, the display terminal 1, and the mobile communication device 2.

To control access to the selected actuator 3, 3', the processing unit 10, 20 of the mobile communication device 2 or the display terminal 1, respectively, requests the user to enter a password, particularly, for writing data into the data store 32 of the actuator 3, 3'. At the actuator 3, 3', access authorization is checked based on the password or a cryptographic access key generated by the processing unit 10, 20 from the password. Preferably, the processing unit 10, 20 is configured to reuse the password and/or cryptographic access key for accessing any other actuator 3, 3' on the communication bus 5, so that the user is required to enter a password just once to access more than one actuators 3, 3' on the communication bus 5, as described above.

FIG. 9 illustrates a modular HVAC system 130 comprising an actuator 3 and a sensor system 110 which are connected via close range radio communication interfaces 13, 33 over a direct wireless local communication link 45.

The sensor system 110 comprises a close range radio communication interface 13 configured to establish a local communication link 45 to the actuator 3 via a close range radio communication interface 33 that is connected to the actuator 3 and located in communication range of the sensor system's close range radio communication interface 13. Depending on the embodiment, the actuator 3 and the sensor system 110 are arranged in one and the same housing or in separate housings. The sensor system 110 comprises one or more of the following sensors 111 for measuring operational values of the HVAC system 130: a temperature sensor, a humidity sensor, a pressure sensor for measuring the differential pressure of a fluid, a flow sensor for measuring the flow of a fluid, e.g. air or water, a carbon dioxide sensor, a carbon monoxide sensor, and/or a smoke detection sensor. The one or more sensors 111 are connected to the sensor system's close range radio communication interface 13, configured to transmit operational values of the HVAC system 130 measured by the sensors 111 via the local communication link 45 to the actuator 3. The actuator 3 comprises a controller 34 connected to the actuator's close range radio communication interface 33 and configured to receive operational values from the sensors 111 via the local communication link 45. The actuator 3 comprises a data store 32 accessible to the actuator's close range radio communication interface 33 and the actuator's controller 34 for reading and/or writing data values. The controller 34 is further configured to control operation of the actuator's electric motor 30 in accordance with the operational values of the HVAC system 130 received from the sensors 111. For example, the controller 34 is configured to control the motor 30 in accordance with the received operational values to move an actuated part, e.g. a valve or a flap, to a defined position for adjusting the opening size of an orifice to control the flow of a fluid, e.g. in a pipe. In another embodiment, the sensor system 110 comprises a controller 112 connected to the sensors 111 and configured to generate actuator control signals in accordance with the measured operational values of the HVAC system 130, and to transmit the actuator control signals via the local communication link 45 to the actuator 3. The actuator 3 is configured to receive the control signals via the local communication link 45 and to control operation of the actuator's electric motor 30 in accordance with the received actuator control signals. For example, the actuator 3 is configured to control the motor 30 in accordance with the received actuator control signals to move an actuated part as described above to control the flow of a fluid. In an embodiment, the sensor system 110 is arranged in a thermostat and/or as part of the display terminal 1 described above.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the invention.

The invention claimed is:

1. A mobile communication device comprising:
a mobile radio communication module configured for data communication in a mobile radio communication network;
a close range radio communication module, in addition to the mobile radio communication module, configured to establish a local communication link to an actuator of a heating, ventilation, air conditioning, and cooling (HVAC) system via a close range radio communication interface that is connected to the actuator and located in communication range of the close range radio communication module; and
a processing unit connected to the mobile radio communication module and the close range radio communication module, and configured to:
determine actuator identification information of the actuator associated with the established local communication link;
receive location-specific actuator data from a data store of the actuator via the established local communication link and transmit the location-specific actuator data to a remote data server via the mobile radio communication network, the location-specific actuator data specifying the actuator and including operation-related actuator data, related to operation of the actuator and recorded by the actuator; and
receive from the remote data server remote actuator data for defining further operation of the actuator and transmit the received remote actuator data to data store of the actuator via the established local communication link, the contents of the location-specific actuator data being dependent on the determined actuator identification information associated with the established local communication link to the actuator.

2. The mobile communication device of claim 1, wherein the processing unit is further configured to determine interface identification information, which identifies the close range radio communication interface associated with the local communication link, the location-specific actuator data being defined by the interface identification information.

3. The mobile communication device of claim 1, wherein the processing unit is further configured to determine the actuator identification information, which identifies the actuator associated with the local communication link, the location-specific actuator data being defined by the actuator identification information.

4. The mobile communication device of claim 1, wherein the close range radio communication module is further configured to establish automatically the local communication link to the close range radio communication interface upon the close range radio communication interface being located in communication range of the close range radio communication module.

5. The mobile communication device of claim 1, wherein the processing unit is further configured to determine actuator identification information of one or more actuators connected to the close range radio communication interface, to show on a display screen the actuator identification information by displaying at least one of: identification numbers of the actuators, descriptive names of the actuators, visual representations of the actuators, location indication of the actuators, a floor plan including markings of the actuators, and a wiring plan including markings of the actuators.

6. The mobile communication device of claim 5, wherein the processing unit is further configured to receive from a user selection instructions for selecting at least one of the actuators connected to the close range radio communication interface, and to establish the local communication link via the close range radio communication interface to the at least one actuator defined by the selection instructions.

7. The mobile communication device of claim 1, wherein the processing unit is further configured to show a floor plan on a display screen, and to indicate on the floor plan a particular actuator dependent on the identification information associated with the local communication link to the actuator.

8. The mobile communication device of claim 1, wherein the remote actuator data includes at least one of: program code for the actuator, configuration parameters for the actuator, and a value of altitude.

9. The mobile communication device of claim 1, wherein the location-specific actuator data includes configuration data stored in the actuator, and
wherein the operation-related actuator data indicates for the actuator at least one of: number of cycles, number of movements, maximum travel angle, minimum travel angle, current position, maximum position, minimum position, current sensor values, a combination of sensor values, state of an energy storage element of the actuator, a type of valve connected to the actuator, a Kvs value of the valve, and malfunction information of the actuator.

10. The mobile communication device of claim 1, wherein the location-specific actuator data specifies the actuator by identifying the close range radio communication interface associated with the local communication link, or by identifying the actuator associated with the local communication link.

11. The mobile communication device of claim 1, wherein the location-specific actuator data includes program code for controlling a processor of the actuator.

12. The mobile communication device of claim 1, wherein the actuator is configured to drive valves and/or dampers for controlling a flow of fluids in the HVAC system.

13. A method of managing operation of a plurality of actuators of a heating, ventilation, air conditioning, and cooling (HVAC) system, the method comprising:

establishing a local communication link from a mobile communication device to one of the actuators via a close range radio communication interface that is connected to the actuator and located in communication range of a close range radio communication module of the mobile communication device;

determining by a processing unit of the mobile communication device actuator identification information of the one of the actuators associated with the established local communication link;

receive location-specific actuator data by the mobile communication device from a data store of the actuator via the established local communication link and transmit the received location-specific actuator data to a remote data server via a mobile radio communication network, the location-specific actuator data specifying the actuator and including operation-related actuator data, related to operation of the actuator and recorded by the actuator; and receive, from the remote data server by the mobile communication device, remote actuator data for defining further operation of the actuator and transmit the received remote actuator data to the data store of the actuator via the established local communication link, the contents of the location-specific actuator data being dependent on the determined actuator identification information associated with the established local communication link to the actuator.

14. The method of claim 13, wherein the method further comprises determining by the processing unit interface identification information, which identifies the close range radio communication interface associated with the local communication link, the location-specific actuator data being defined by the interface identification information.

15. The method of claim 13, wherein the method further comprises determining by the processing unit actuator identification information, which identifies the actuator associated with the local communication link, the location-specific actuator data being defined by the actuator identification information.

16. The method of claim 13, wherein the remote actuator data includes at least one of: program code for the actuator, configuration parameters for the actuator, and a value of altitude.

17. The method of claim 13, wherein the location-specific actuator data includes configuration data stored in the actuator, and the operation-related actuator data indicates for the actuator at least one of: number of cycles, number of movements, maximum travel angle, minimum travel angle, current position, maximum position, minimum position, current sensor values, a combination of sensor values, state of an energy storage element of the actuator, a type of valve connected to the actuator, a Kvs value of the valve, and malfunction information of the actuator.

18. The method of claim 13, wherein the actuators are configured to drive valves and/or dampers for controlling a flow of fluids in the HVAC system.

19. A computer program product comprising a non-transitory computer readable medium having stored thereon computer program code configured to direct a processor of a mobile communication device, which comprises a mobile radio communication module, connected to the processor and configured for data communication in a mobile radio communication network, and a close range radio communication module, in addition to the mobile radio communication module, connected to the processor and configured to establish a local communication link to an actuator of a heating, ventilation, air conditioning, and cooling (HVAC) system via a close range radio communication interface that is connected to the actuator and located in communication range of the close range radio communication module, such that the processor:

determines actuator identification information of the actuator associated with the established local communication link;

receives location-specific actuator data from a data store of the actuator via the established local communication link and transmits the received location-specific actuator data to a remote data server via the mobile radio communication network, the location-specific actuator data specifying the actuator and including operation-related actuator data, related to operation of the actuator and recorded by the actuator; and receives, from the remote data server via the mobile radio communication network, remote actuator data for defining further operation of the actuator and transmits the received remote actuator data to the data store of the actuator via the established local communication link, the contents of the location-specific actuator data being dependent on the determined actuator identification information associated with the established local communication link to the actuator.

20. The computer program product of claim 19, wherein the actuator is configured to drive valves and/or dampers for controlling a flow of fluids in the HVAC system.

* * * * *